United States Patent [19]
Bruinsma et al.

[11] Patent Number: 5,803,564
[45] Date of Patent: Sep. 8, 1998

[54] METHOD AND APPARATUS FOR VIEWING DEPTH IMAGES

[76] Inventors: Michael R. Bruinsma; Jeffrey P. Bruinsma, both of 76 Angean Dr., Webster, N.Y. 14580; Jonathan E. Forward, 53 Flower Valley Cir., Penfield, N.Y. 14526

[21] Appl. No.: 785,893

[22] Filed: Jan. 21, 1997

[51] Int. Cl.[6] .................................................. G03B 21/14
[52] U.S. Cl. .............................. 353/10; 353/119; 353/109
[58] Field of Search .............................. 353/7, 9, 10, 109, 353/108, 119; 359/466, 467, 468, 469, 475, 477, 478

[56] References Cited

U.S. PATENT DOCUMENTS 3,197,888  8/1965  Held ........................................ 359/468
4,037,926  7/1977  Spence-Bate ........................... 359/469
5,492,578  2/1996  Morton .
5,543,964  8/1996  Taylor et al. .

*Primary Examiner*—William Dowling
*Attorney, Agent, or Firm*—Cumpston & Shaw

[57] ABSTRACT

An apparatus and method are disclosed for viewing depth images having different depth image scenes being projected at different viewer orientations. A frame is rotatably mounted to a stand for rotation about an axis, wherein the frame includes at least one viewing port. An interior of the frame is back lit to illuminate the viewing port. The frame includes a retainer for securing a depth image to the frame. The frame is rotated about the axis by a drive assembly to present at least one cycle of information from the depth image to a stationary viewer.

13 Claims, 5 Drawing Sheets

METHOD AND APPARATUS FOR VIEWING DEPTH IMAGES

FIELD OF THE INVENTION

The present invention is directed to a method and apparatus for viewing depth images that have changing display information and, more particularly to viewing depth images in which display information, distinct from the normal depth/look around display information, appears and disappears as the perspective of the viewer changes.

BACKGROUND OF THE INVENTION

Conventional depth images provide the viewer with a sense of depth which is some times called binocular stereopsis. Conventional depth image displays, either of the lenticular or barrier type, because a stereo effect is being provided, present slightly different scene information to the viewer as the viewer's head moves in a horizontal direction in front of the depth image. This effect called a look around effect occurs because each eye is presented with a different image or view of the scene. As the position of the eye moves relative to the depth image the view presented to each eye changes. Because the mind of the viewer fuses the slices of the same scene reaching each eye the viewer senses depth in the photograph being viewed. If the different view points of the scene gradually expose a hidden object, the viewer experiences the ability to look around objects in the depth photograph. This experience of depth is provided even though the lenticular photograph is a generally planar object.

The ability of the lenticular photograph to provide different image slices to the eye is possible because an image substrate includes adjacently recorded image slices each of which is projected in a different direction by the cylindrically shaped lenses, called lenticules, which are part of the lenticular face plate positioned in front of the substrate. In barrier type depth images a barrier strip face plate is substituted for the lenticular face plate. Additional information on the background and the theory of depth images can be obtained from Okoshi, Three-Dimensional Imaging Techniques, 1976 published by Academic Press. Conventional depth images, such as those discussed above, present the viewer with images from the same scene with changes in image information being limited to changes in content being provided by different viewpoints of the same scene. Lenticular viewing devices currently exist in which the information presented changes as the viewpoint of the lenticular object changes. These objects, typified by lenticular baseball cards and prizes found in boxes of caramel coated nuts and popcorn, present the viewer with different pictures of different scenes as the vertical viewpoint changes. For example, from one viewpoint the viewer would see a picture of a baseball player and from a different vertical viewpoint the viewer would see a picture of a different baseball player. These pictures are planar pictures with no sense of depth being provided.

However, technology has developed to provide a depth image that radically changes the information provided to the viewer as the viewpoint changes horizontally while the sense of realism or depth is preserved. It is contemplated the depth image may incorporate information not related to the depth image scene can be provided to the viewer from different viewpoint orientations. The resulting depth image creates an image sequence of gradually changing display information, either temporal or spatial, unrelated to the depth content in conjunction with sufficient information being presented in each successive horizontal image to enable binocular stereopsis or depth perception in a viewer when positioned at one or more possible horizontal viewing locations in the viewing space. The depth image may present such changing information as photographically captured images or computer generated graphics or text which is superimposed on view perspective changing information to be concurrently visible at one or more possible locations in the viewing space. In fact, the depth images may include dissimilar information compiled from two or more distinct sources of image sequences with sufficient information being retained to provide the viewer with a sense of depth or binocular stereopsis at one or more locations in the viewing space. Therefore, a depth image may provide the viewer with animation of a scene as the viewer changes horizontal head position while maintaining a sense of depth or binocular stereopsis. Further, multiple depth images from the same image space may be provided. That is, a depth image in which information in addition to the conventional depth information changes as the viewer's head changes position is now possible. U.S. Pat. No. 5,543,964 to Taylor et. al, assigned to Eastman Kodak Company, based on U.S. Ser. No. 08/174,657 filed Dec. 28, 1993 is herein incorporated by reference.

It is contemplated these depth images may be used in promotional materials, advertising point of purchase displays, as well as scientific and medical information transfers. That is, in some applications there may be a real time viewing parameter that allows the changing display information to reproduce a temporal parameter accurately. Specifically, if the depth image includes human motion or certain physiology, or chemical reactions, an important aspect of the information captured in the depth image may reside in the temporal relations.

Conventional electronically printed lenticular photographs are printed hard copy images that change in appearance with viewer orientation to the display. In these conventional applications of the technology, the changing viewing perspective of a single static image scene enables stereopsis by the viewer with a look around effect which creates an experience analogous to viewing the real world. The present depth images, in contrast to this conventional technology, radically changes the information or content of the image seen by the viewer at different angular locations, display bands or display spaces within the display angle of a lenticular face plate of a lenticular photograph while maintaining the viewer's perception of depth or the stereopsis effect.

Therefore, a need exists for a device and method to reproducibly view a depth image. Preferably, the device and method are economical to produce, while providing multiple uses without failure. In a preferred embodiment, the device can accommodate a variety of viewing or replay speeds. In addition, the need exists for a device to allow successive viewing of a plurality of depth images. By the method and apparatus described herein animation or graphics or different images can be made to appear to the viewer.

SUMMARY OF THE INVENTION

A method and apparatus for rotating a depth image at a predetermined speed relative to a stationary viewer, thereby allowing the viewer to completely view the entire information of the depth image within a single revolution of the display. The display device includes a rotatable frame defining an interior and an exterior, the frame including a viewing port between the interior and the exterior; a retainer connected to the frame to retain the depth image adjacent to the viewing port; a light source or projector for projecting light in the interior of the frame to pass to the exterior of the frame through the viewing port; and a motor for rotating the frame about an axis. In a second embodiment, the display further includes a lens in the viewing port to create a substantially uniform light intensity throughout the viewing port. The lens and the light projector are selected to create a substantially uniform light intensity throughout the viewing port. The display may further include a housing sized to substantially enclose the frame and the retainer, wherein the housing has a window across which the viewing port passes upon rotation of the frame about the axis. It is understood the frame may include a plurality of viewing ports. Preferably, the window is sized to encircle a plurality of viewing ports.

Illumination of the depth image may be accomplished by any of a variety of mechanisms including an incandescent bulb, a halogen bulb, a fluorescent bulb and a fiber optic in the interior of the frame. Depending upon the particular source of illumination, the frame may include a vent for permitting a flow of ambient air between the interior and the exterior of the frame.

DETAILED DESCRIPTION OF THE PREFERRED EMBODIMENTS

Figure 1:
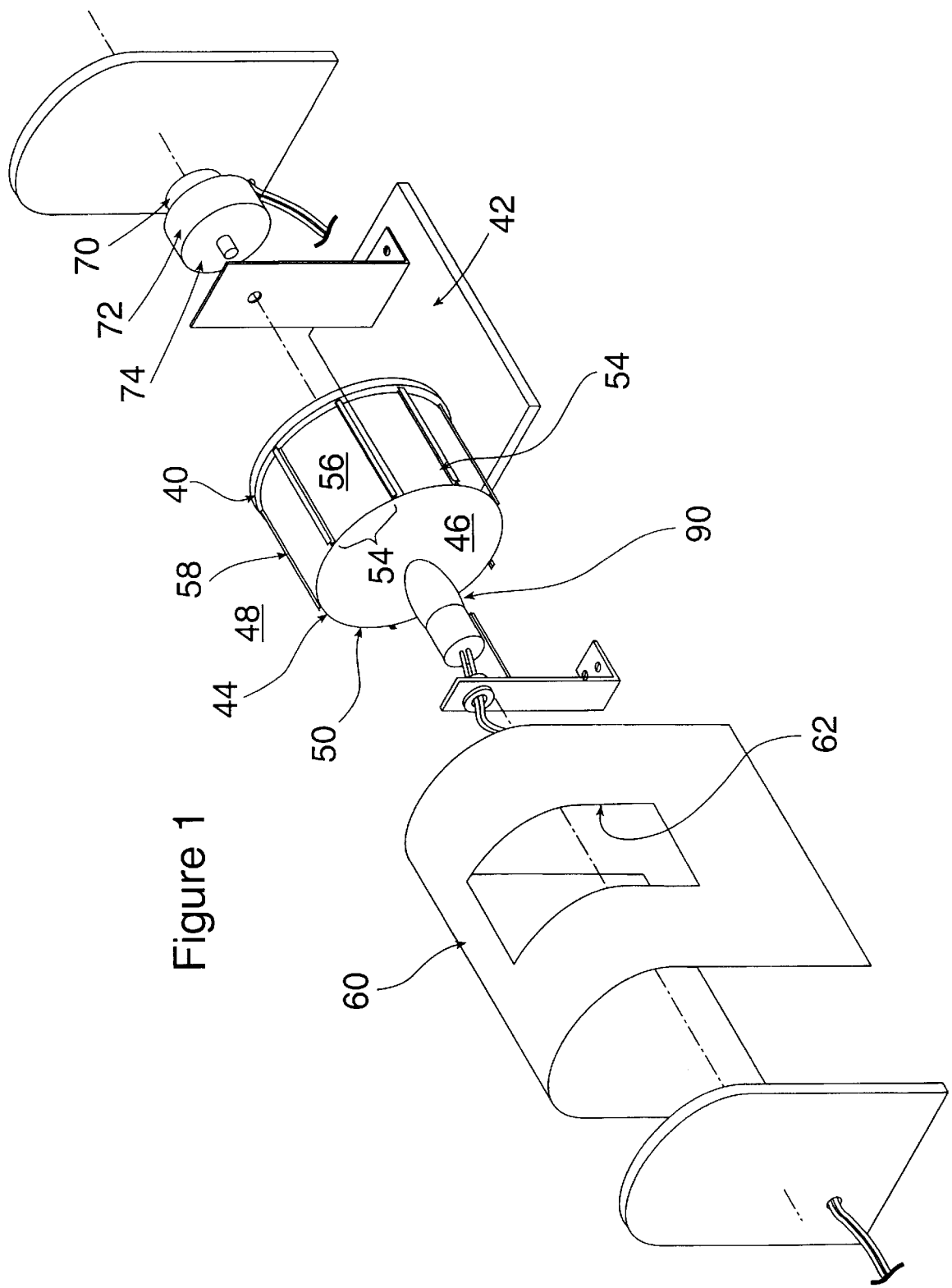
FIG. 1 is an exploded perspective partial cut away view showing an embodiment of the present display.
Figure 2:
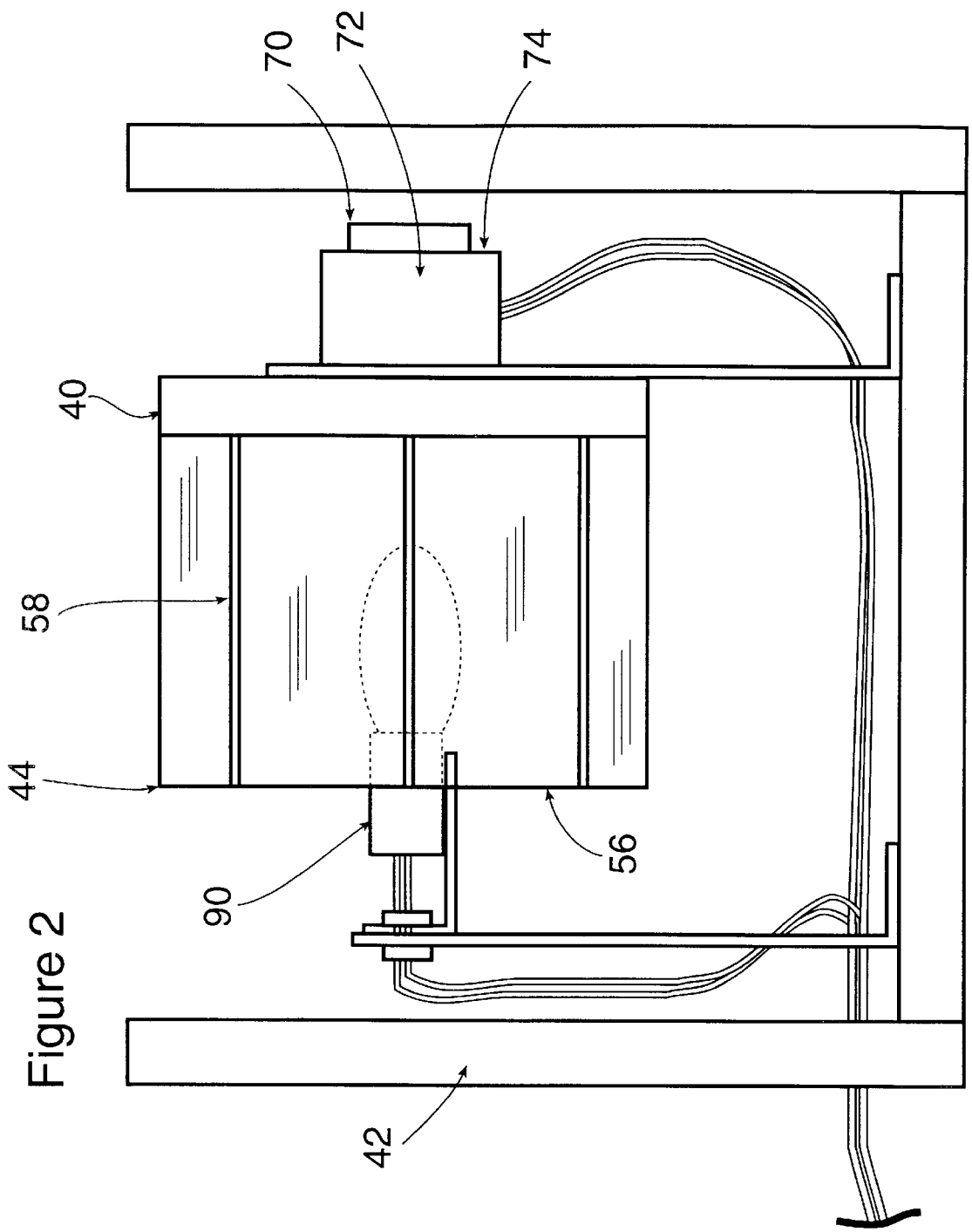
FIG. 2 is a side elevational view of the stand, rotatable frame and light projector.
Figure 3:
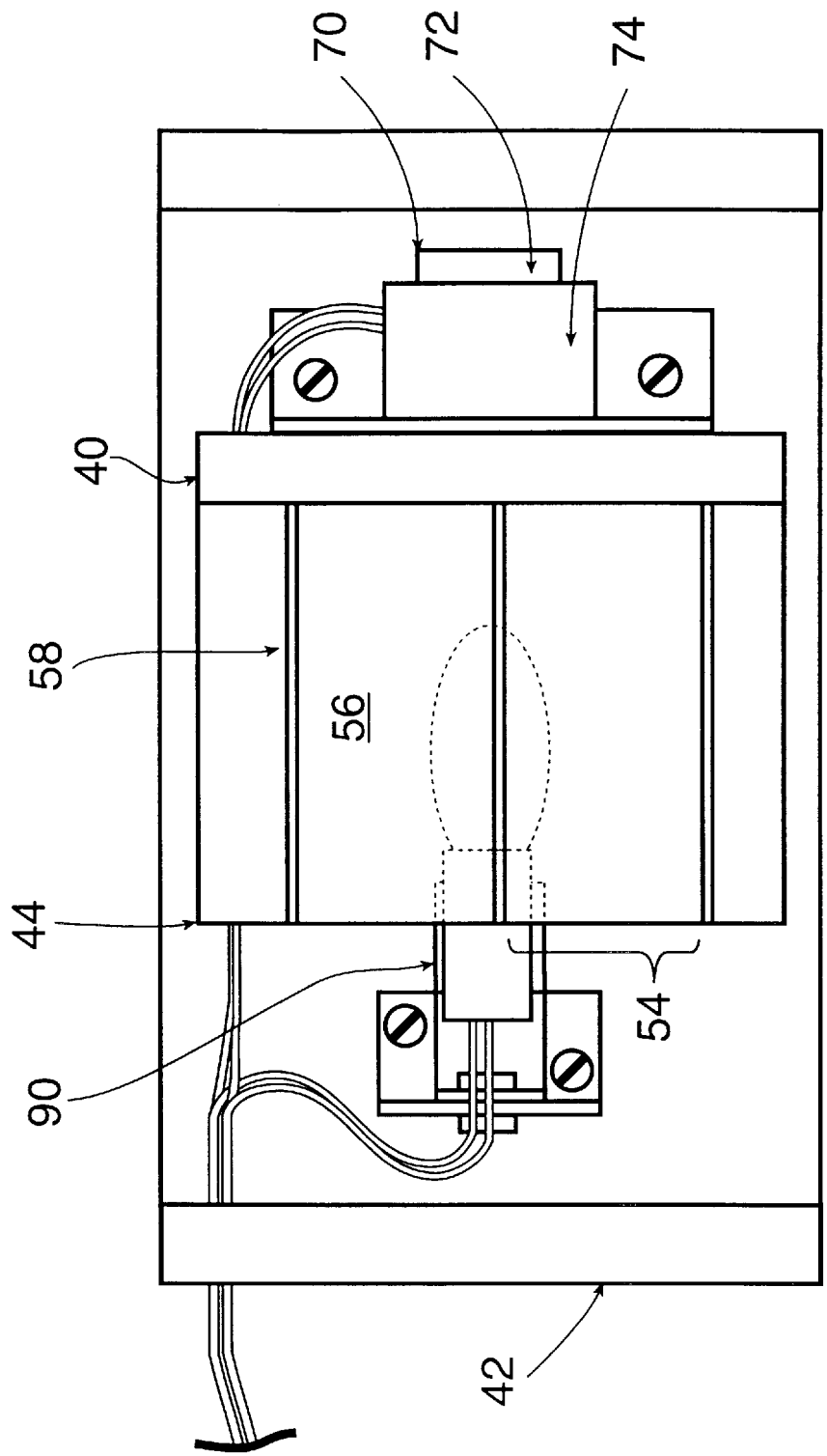
FIG. 3 is a top plan view of FIG. 2.
Figure 4:
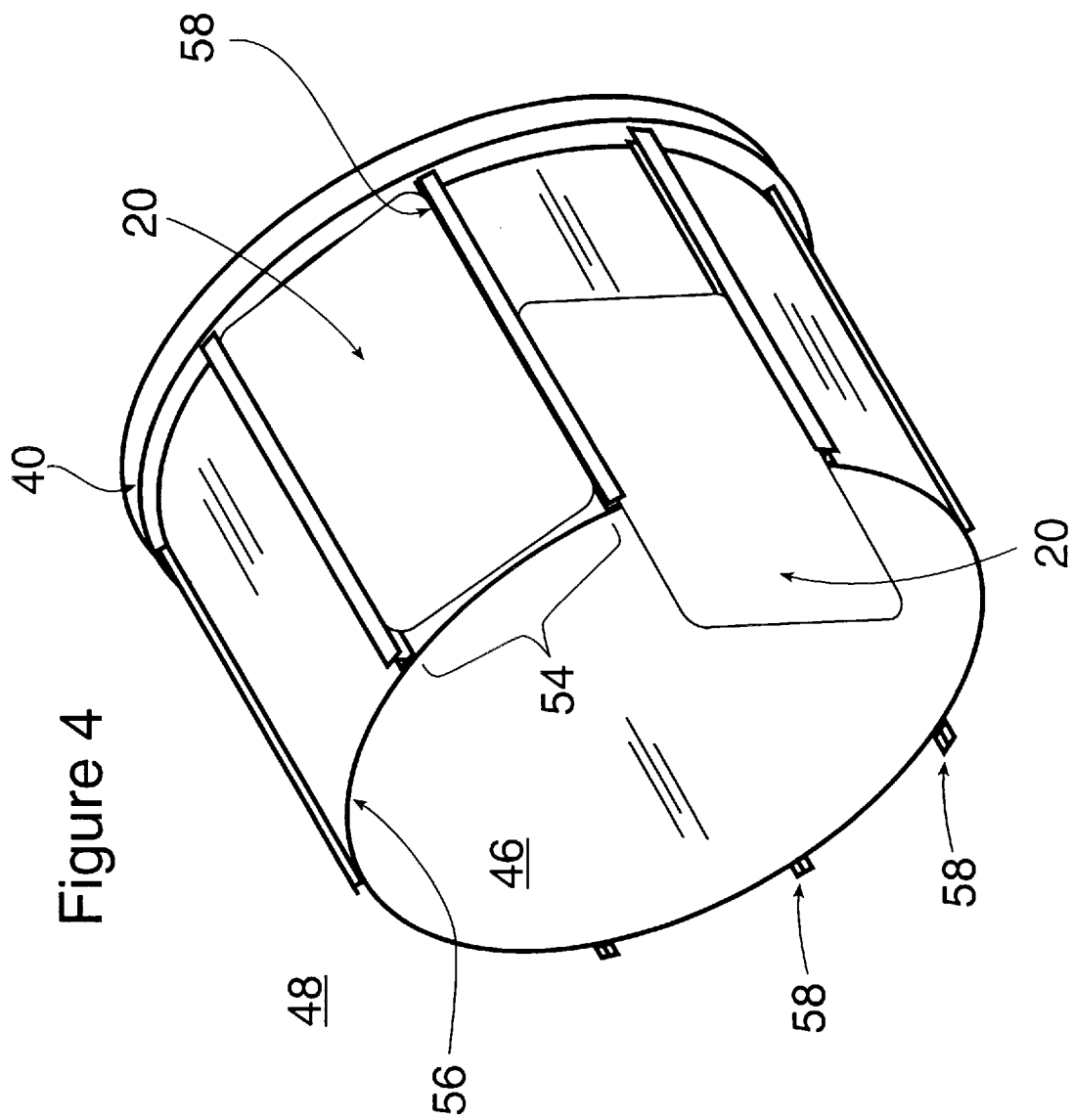
FIG. 4 is an enlarged perspective view of a portion of the rotatable frame showing the retention of a plurality of depth images.
Figure 5:
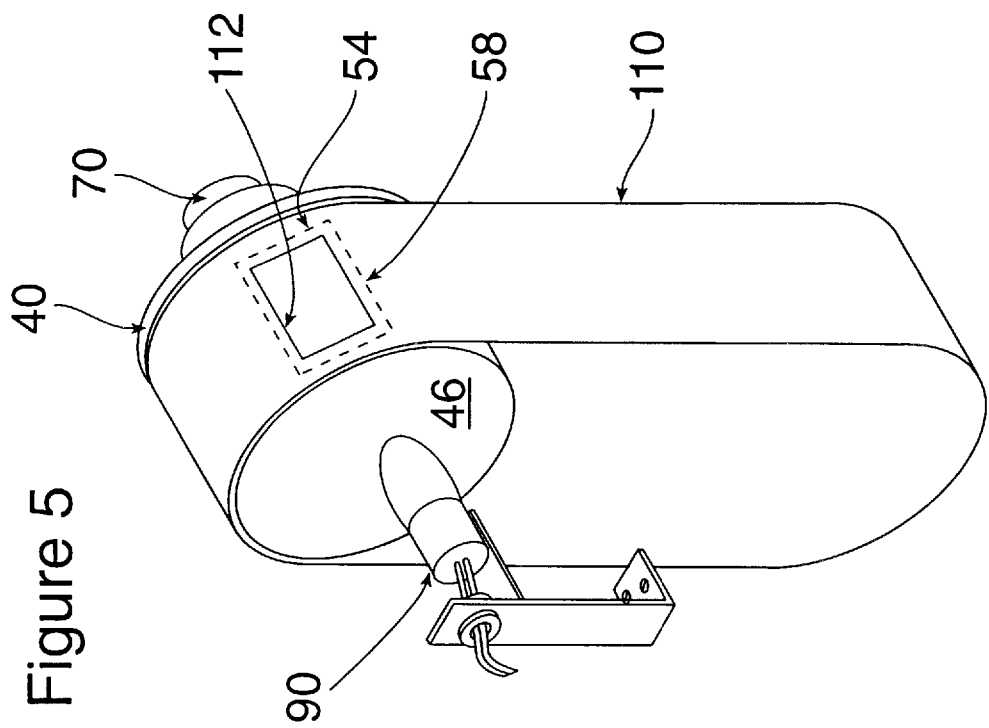
FIG. 5 is a schematic view of an alternative configuration of the display device for the depth images.

To provide different depth images to the viewer from different lenticular photograph viewing orientations, different perspective view series must be captured (or created). By properly interleaving image slices from the different view perspectives and the different scenes, a depth image 20 can be created which provides a depth image of a first object to the viewer from a first lenticular photograph view orientation and provides a depth image of the second object to the viewer from a second orientation.

To provide the different scenes to the viewer from the different view orientations, the view slices from the different scenes and perspectives must be interleaved with respect to a lenticules of a lenticular face plate. The interleaving of different perspectives of a scene with the perspectives of a different scene allows the viewer to see different scenes from different view orientations while the depth of each scene is preserved.

Because at least two view slices from each scene taken from different angular perspectives or viewpoints, binocular stereopsis or the perception of depth is preserved. Because this particular example includes at least three slices from the same scene in each scene series, look around capability is preserved. By providing more than three slices from each scene additional look around capability is provided and realism is enhanced for each of the scenes projected. It will be recognized by those of skill in the art that instead of projecting scenes of different items, each series could project different scenes, such as a first series projecting a picture of a mountain, a second series projecting a picture of a beach and a third series projecting a picture of a plain. Using the printing technology presently commercially available along with commercially available lenticular face plates those of ordinary skill in the art can record at least twenty-four slices behind each lenticule of a fifty-two lenticule per inch face plate. As a result, it is possible to record from two to eight different scenes behind each lenticule and preserve look around capability and record from two to twelve different scenes while preserving stereopsis or the perception of depth. In addition to projecting different scenes to the viewer while preserving stereopsis and/or look around capability, the present invention allows look around capability to be provided along with image animation.

A person of skill in the art can create the appropriate process for combining more than two scenes animation. The first operation is to capture the appropriate number of images of the scenes. For example, if the two scenes are being used with the commercially available printer and face plate technology twelve perspectives of each scene would be captured.

The present invention has been described with respect to providing different scenes within a depth image 20. It will be recognized by those of skill in the art that graphics or text information can be substituted for the scene information. The text could be planar or depth text. Of course it is possible to substitute a text or graphics image for either or both of the image. It is also possible to provide attention getting features in the lenticular photograph. For example, by employing a solid, bright, single color, separator slice or band, the viewer will experience a bright image flash in the transition. By making the separator band a color that is complimentary to the scene background colors, an effect of turning the images on-off-on can be created for the viewer as the viewer moves between spaces. The separator band can also be provided at the edge of the lenticule. The separator band can also be patterned as a depth image in some way that will get the attention of the viewer as the viewer moves through the view spaces. Of course the separator band could be a planar image. Text can suddenly appear to be superimposed on or flashed on top of the depth image (subliminally) if a single slice within each lenticule presents the text image to the viewer. If a live subject is used as the changing object the subject will be perceived as in motion. For example, if the subject gradually closes and opens one eye from perspective to perspective in these figures, as the viewer moves from space to space the subject will appear to be winking. The scene images can be made to appear to fade in and out by varying the intensity that the slices are printed. That is, the scenes will appear to fade in and out as the viewer moves from view space to view space. The same fading can also be provided to graphics overlays that are superimposed on the depth images allowing the viewer to see a gradually emerging graphic on top of a depth image 20 as the viewer moves from side to side through the spaces.

Therefore, for purposes of the present disclosure, a depth image 20 is taken to include the physical structure required to incorporate the display information, distinct from the normal depth/look around display information, appears and disappears as the perspective of the viewer changes. That is, the depth image 20 is similar to a baseball card in that it is a substantially planar, relatively thin rectangular member. It is recognized the depth image 20 may be any of a number of physical forms including square, circular or curvilinear, as well as being non planar. Further, the information may be any of a variety such as sports, news events, historical, scientific, promotional or humor. In addition, the information may be employed in advertising, marketing and point of purchase displays. Further, the information may relate to the entertainment industry including motion pictures and animation.

The present apparatus includes a rotatable frame 40, a drive assembly 70 and an illumination or light projecting system 90. The particulars of each component may be determined at least in part by the particular depth image 20. Therefore, though only relatively small number of systems are described in detail, it is understood that a variety of systems may be employed to achieve similar results within the scope of the present invention.

Rotatable Frame

The rotatable frame 40 is mounted to a stand 42 for rotation relative to the stand. The rotatable mounting may include corresponding pivot pins and sockets between the frame 40 and the stand 42. Alternatively, rotatable mounting between the frame 40 and stand 42 may be accomplished by interlocking tracks and pins or other structures well known in the art. The frame 40 rotates about an axis A—A of rotation, wherein the axis of rotation may be horizontal, vertical, or even an intermediate orientation. Further, depending upon the depth image 20 to be viewed, the frame 40 may rotate either clockwise or counterclockwise about the axis A—A. A peripheral portion 44 of the frame 40 which rotates may have a cross sectional periphery, perpendicular to the axis, that is any of a variety of configurations such as triangular, square, polygonal, curvilinear or circular. The frame 40 defines an interior 46 and an exterior 48.

The interior 46 of the frame 40 includes a light projecting system 90. In one embodiment of the device, the light projecting system 90 is an ordinary filament light bulb. Alternatively, the light projecting system 90 may include a set of optical surfaces and/or mirrors for directing light from the interior 46 of the frame 40 toward the exterior 48 of the frame 40. In another embodiment, the light projecting system 90 may include fiber optics for projecting the light from the interior 46 to the exterior 48. Depending upon the light projecting system 90 employed, the frame 40 may include cooling vents 50 and/or a fan 52 for circulating a flow of ambient air through the interior 46 to preclude heat retention that could damage the depth image 20.

The frame 40 further includes at least one viewing port 54, and preferably a plurality of viewing ports connecting the interior 46 and the exterior 48. The viewing port 54 provides a transparent or translucent link from the interior 46 to the exterior 48. Preferably, the viewing port 54 includes a lens 56 for creating a substantially uniform light intensity throughout the viewing port. That is, the light density is substantially constant over the area of the viewing port 54. Preferably, the viewing port 54 has an area that is at least as large as the area of the depth image 20 to be displayed. Further, the lens 56 is selected to reduce the amount of heat passing from the interior 46 to the exterior 48. The lens 56 may be any of a variety of materials such as frosted glass, plastics, polycarbonates or any other transparent or translucent material having sufficient thermal resistant properties. Preferably, the lens material is relatively light weight to reduce the load on the drive assembly 70. Alternatively, the light projector 90 may be constructed to provide substantially uniform density light distribution, thereby obviating the need for a light modifying lens 56.

If a plurality of viewing ports 54 are employed, the ports may be oriented to pass by a stationary viewer in a substantially linear path. Alternatively, the viewing ports 54 may be disposed to present any curvilinear or even discontinuous path with respect to the viewer. The combination of the frame 40, the light projecting system 90, the lens 56 and the viewing port 54 creates a back lighting at the viewing port.

The frame 40 includes a retainer 58 adjacent each viewing port 54 for operably retaining a depth image 20 with respect to the viewing port. The retainer 58 may be any of a variety of configurations for either permanently or temporarily securing the depth image 20 with respect to the frame 40. In the permanent configuration, the depth image 20, or plurality of depth images are secured to the frame 40 such that the depth image cannot be non destructively removed from the frame. The temporary retention of the depth image 20 may accomplished through the use of channels for receiving an edge of a depth image, sleeves sized to slidably receive the depth image, biased clips for clamping a portion of the depth image to the frame, or even magnetic members that may be independent of the depth image, or cooperate with a portion of the depth image if the depth image is constructed to include a magnetic portion. The retainer 58 generates a sufficient retaining force to retain the depth image 20 relative to the frame 40 throughout the full cycle of rotation of the frame.

The display device may include a housing 60 that substantially encloses the frame 40, the stand 42, the drive assembly 70 and the light projecting system 90. The housing 60 includes a window 62 through which a plurality of viewing ports 54 are exposed. Preferably, the window 62 has a sufficient area so that a given depth image 20 rotates through a sufficient amount of rotation to fully display the information to a stationary viewer. That is, a certain depth image 20 may require rotation through approximately a quarter revolution to fully display the information. Therefore, the window 62 is sized to permit a stationary viewer to see a given depth image 20 pass through a quarter revolution about the axis A—A. Alternatively, it is understood the window 62 may be sized to permit one, two, three or more cycles of information to be viewed by a stationary viewer. That is, the frame diameter, rotation speed, depth image and window size are selected so that a viewer may see one, two or three cycles of the information for a single pass of the depth image 20 through the window 62.

The housing 60 may be constructed in any of a variety of configurations, such as footballs, soccer balls, baseballs, tennis balls or sports equipment complimentary to the intended use of the display device.

Drive Assembly

The drive assembly 70 includes a motor 72 and gearing 74 for transmitting rotation of the motor to the frame 40. The motor 72 may be any of a variety of types, depending upon the anticipated operating environment of the display. That is, the motor 72 may be powered by direct current or alternating current. The motor 72 is preferably sufficiently robust to actuate rotation of the frame 40 relative to the stand 42 at a predetermined rate for a predetermined service cycle. The motor 72 may be a variable speed motor, or alternatively, the gearing may be selected to permit variable speed rotation of the frame 40 relative to the stand 42. It is contemplated the motor 72 may be controlled to allow for stopping the frame 40 so that an individual step in the motion may be viewed for an extended period of time. The drive assembly 70 also includes an on/off switch 76 to activate the display.

The gearing 74 interconnecting the frame 40 and the motor 72 may be a simple pulley and belt type, or interlocking gears such as bevel, worm, spur or other construction well known in the art. Depending upon the type of motor 72 selected and the intended operating parameters of the display, the gearing 74 may be configured to permit variable or selectable speed rotation of the frame relative to the stand, from a constant speed motor.

Depending upon the particular light projector, display size and configuration of the frame 40, the fan 52 may be fluidly connected to the interior 46 of the frame to circulate air through the interior to preclude excessive heat retention within the frame.

In a further embodiment, a sound reproducing system 78 may be operably connected to the display device. The sound reproducing system 78 may be directed tied to the depth image 20, the rotation of the frame 40 or the drive assembly 70. Alternatively, the sound system 78 may be independently controlled. The sound system 78 may include any of a variety of devices that are readily available such as tape, DAT, CD, radio.

In yet another embodiment, a flexible belt 110 may transport the depth image 20 relative to the light projector 90 and the viewer. Specifically, an endless flexible belt 110 is rotated about the light projector 90. The belt 110 has at least one aperture 112 through which light may pass. The belt 110 and the light projector 90 are aligned so that light projected from the light projector passes through the aperture 112 during a portion of the apertures travel. In this embodiment, as in the prior embodiments, the aperture 112 may or may not incorporate a light modifying lens 56. The apertured belt 110 has sufficient flexibility so that it may be drawn past the light projector 90. The belt 110 may be constructed to exhibit a wide variety of lengths and widths, thereby permitting a large number of viewing configurations for the depth images 20. The belt 110 may be driven by direct connection to the motor 72, or through the drive system 70. The belt 110 includes a retainer 58 for holding a depth image 20 relative to the belt and passing the depth image across the projected light passing through the aperture 112.

In the belt embodiment, the display may operate with or without a rotatable frame 40. Specifically, if the frame 40 were fixed, the frame would include a sufficiently viewing port 54 to fully display the information of a depth image 20 as the depth image travels across the aperture. The belt 110 would then be pulled across the frame 40 to pass a given depth image 20 across the viewing port 54 in the frame. Alternatively, the frame 40 may still rotate, and the belt aperture 112 and frame viewing port 54 are synchronized so that a depth image 20 on the belt 110 is exposed to light from the projector 90 in the interior 46 of the frame. Application of the belt 110 and rotating frame 40 allows the frame to be the primary motive force for movement of the belt. Upon fixing the frame 40, rotation of the belt 110 results from connection to the drive assembly 70.

In Operation

In operation, a depth image 20 is retained relative to the frame 40, and the drive assembly 70 is actuated to rotate the frame relative to the stand 42. The depth image 20 thus passes across the window 62 in the housing 60, throughout a portion of the revolution about the axis A—A. The light projecting system 90 is activated to project light through the viewing port 54 and the lens 56, thereby back lighting the depth image 20. As the frame 40 rotates relative to the stationary viewer, the information, including apparent motion embedded in the depth image 20 is presented to the viewer, without requiring the viewer to move their head. As stated, depending upon the display device and the depth image 20, a single or plurality of cycles of the depth image may be viewed through the window 62.

Further, if the plurality of viewing ports 54 are located at a fixed longitudinal position along the axis of rotation A—A, consecutive depth images 20 will be sequentially present to the viewer such that once the information from a first depth image is completely viewed by the viewer (without requiring motion of the viewer), a second depth image is immediately beginning its information display to the particular viewer. Therefore, by locating a plurality of viewers with respect to the window 62, each viewer may simultaneously view a plurality of depth images 20 from the same display, without interfering. While the viewers will be viewing different depth images at a given time, each of the depth images 20 will be serially presented to the particular viewer.

The window 62 in the housing 60, the relative positioning of the viewing ports 54, and the rotation rate of the frame 40 are selected such that if the depth image 20 includes information which has a motion component (such as ball throwing, character action, blood flowing) the replication of the real time information is achieved. That is, the rotation of the depth image 20 relative to the viewer may be sufficiently controlled to accurately reproduce real time events. Alternatively, the relative "play back" speed of the depth image 20 may controlled to meet any of a variety of replay parameters, such as anticipated length of viewer access, the number of depth images 20 carried by the display device as well as the relationship of sequential depth images.

Preferably, the window size, rotational speed about the axis, size of the frame and light projection system are selected to render a depth image in the retainer back lit through out its travel path across the window. Further, the back lighting is consistent throughout the travel path in the window 62. That is, if the depth image 20 has a plurality of information cycles during a pass across the window 62, the back lighting is constant for each cycle.

In the belt system configuration, the speed of travel of the belt 110 relative to the frame 40 and viewer can be controlled to provide time parameter accurate presentation of the information in the depth image 20.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. An apparatus for displaying an image substrate to a stationary position, comprising:
    (a) an image substrate including at least two images;
    (b) a rotatable frame defining an interior and an exterior, the frame including a viewing port between the interior and the exterior;
    (c) a retainer connected to the frame to retain the depth image adjacent to the viewing port;
    (d) a light projector for projecting light in the interior of the frame to pass through the viewing port to the exterior of the frame; and
    (e) a motor for rotating the frame about an axis to move the image substrate through a sufficient change of orientation with respect to the stationary position to present the two images to the stationary position.

2. The apparatus of claim 1, further comprising:
    (a) a lens in the viewing port to create a substantially uniform light intensity throughout the viewing port.

3. The apparatus of claim 1, further comprising:
    (a) a housing sized to substantially enclose the frame and the retainer, the housing having a window across which the viewing port passes upon rotation of the frame about the axis.

4. The apparatus of claim 3, wherein the frame includes a plurality of viewing ports.

5. The apparatus of claim 4, wherein the window is sized to encircle a plurality of viewing ports.

6. The apparatus of claim 1, wherein the light projector includes one of an incandescent bulb, a halogen bulb, a fluorescent bulb and a fiber optic in the interior of the frame.

7. The apparatus of claim 1, wherein the frame includes a vent for permitting a flow of ambient air between the interior and the exterior of the frame.

8. An apparatus for displaying an image substrate to a stationary position, comprising:
   (a) a light projector;
   (b) a belt movable relative to the light projector, the belt having an aperture therein for permitting light to pass through the aperture;
   (c) a retainer for retaining the image substrate relative to the belt and dispose a portion of the image substrate to occlude the aperture; and
   (d) a drive mechanism operably connected to the belt for moving the belt relative to the light projector.

9. An apparatus for displaying an image substrate to a stationary position, comprising:
   (a) a rotatable frame defining an interior and an exterior, the frame including a viewing port between the interior and the exterior;
   (b) a retainer connected to the frame to retain the image substrate adjacent to the viewing port;
   (c) a light projector for projecting light in the interior of the frame to pass through the viewing port to the exterior of the frame; and
   (d) a drive for rotating the frame about an axis to move the image substrate through a sufficient change of orientation with respect to the stationary position to present the image substrate to the stationary position.

10. A method of displaying an image substrate to a stationary viewer, the image substrate having a cycle of information reproducible by changing the relative viewing angle between the image substrate and the stationary viewer, comprising:
    (a) securing an image substrate to a frame such that a portion of the image substrate overlies a portion of a viewing port;
    (c) rotating the frame about an axis; and
    (d) sizing the frame so that upon rotation of the image substrate about the axis at least one cycle of information is presented to the stationary viewer during a single rotation about the axis.

11. A display apparatus, comprising:
    (a) a rotatable frame including an illuminatable viewing port;
    (b) a retainer to retain an image adjacent to the viewing port;
    (c) a light projector for illuminating the viewing port; and
    (d) a drive mechanism for rotating the frame about an axis to move the image through a sufficient change of orientation with respect to the viewer to present the image to the viewer.

12. The apparatus of claim 11, wherein the drive mechanism includes a motor for actuating the drive mechanism.

13. The apparatus of claim 11, wherein the light projector includes one of an incandescent bulb, a halogen bulb, a fluorescent bulb and a fiber optic.

* * * * *